Jan. 2, 1940.   W. L. SULLIVAN   2,185,529

BLUE PRINT MACHINE

Filed Nov. 10, 1937

INVENTOR.
WARREN L. SULLIVAN
BY D. Clyde Jones
ATTORNEY.

Patented Jan. 2, 1940

2,185,529

UNITED STATES PATENT OFFICE 2,185,529

BLUE PRINT MACHINE

Warren L. Sullivan, Rochester, N. Y., assignor to Paragon Revolute Corporation, Rochester, N. Y., a corporation of New York Application November 10, 1937, Serial No. 173,819

4 Claims. (Cl. 74—194)

This invention relates to an improved blue printing machine and to a governor controlled friction drive unit therefor.

In blue print machines of the type wherein blue print paper and a tracing in superimposed position are carried by a belt or the like past a light source to print the tracing image on the paper, it is essential to provide an adjustable friction device to drive the belt at predetermined speeds. Such a friction device has included a driving disk with the flat face of which the leather periphery of a friction wheel is held in contact under the action of a manually adjusted spring. The pressure between the driving disk and the friction wheel was maintained even while the blue print machine was idle. As a result, when the machine stood idle for any length of time the constant pressure of the driving disk on the leather friction wheel caused a flattening of the periphery of the wheel. The resulting flat spots necessitated frequent replacement or truing up of the leather ring of the wheel since the ring must be circular for efficient operation. Also it was difficult to adjust the speed at which the blue print machine was to operate, when the the machine was idle, since the driving disk always pressed firmly against the friction disk and resisted movement of the friction disk relative to the driving disk. By this invention, applicant insures proper pressure between the driving disk and the friction disk or wheel while the apparatus is in operation but removes any harmful pressure between the driving and friction disks when the apparatus is idle.

It is an object of this invention to provide a blue print machine in which the operating speed thereof may be more readily adjusted than heretofore.

It is a further object of this invention to provide a novel friction drive unit in which the creation of flat spots on the periphery of the friction disk is entirely eliminated.

It is another object of this invention to provide a novel friction drive in which the driving pressure against the friction wheel is automatically and uniformly maintained when the device is running.

It is a still further object of this invention to provide a friction drive unit in which the replacement of the leather or similar friction material ring is facilitated, by omitting positive pressure between the driving disk and the friction disk while the machine is idle.

These and other objects of the invention will appear from the detailed description and the drawing in which.

Figure 1:
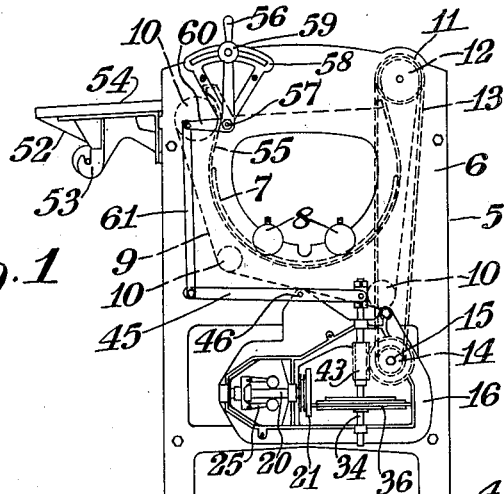
Fig. 1 is an end elevation of a blue print machine made in accordance with the invention.

Referring to Fig. 1, 5 indicates a blue print machine comprising a frame 6 provided with a fixed semi-cylindrical plate glass guide 7 to partially enclose mercury vapor lamps 8. An endless canvas apron 9 is guided about rollers 10 and the drive roll 11 in contact with the outer surface of the glass guide, these rollers being suitably journaled in the frame 6. The drive roller 11 is provided with a sprocket 12 engaged by the driving chain 13, which is driven by a second sprocket 14 mounted on the shaft 15 journaled in the frame of the machine.

Figure 2:
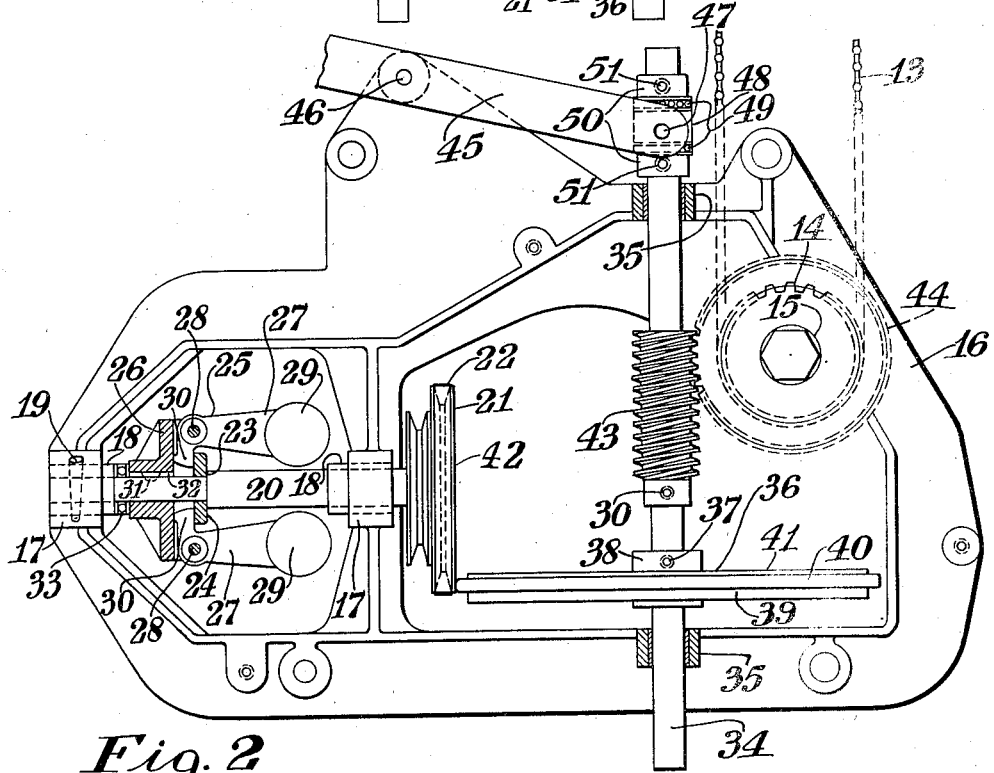
Fig. 2 is an elevation of a portion of the blue print machine illustrated in Fig. 1 and showing particularly the improved friction drive unit thereof.

Referring to Fig. 2 there is shown in detail, the improved friction drive unit for rotating the shaft 15 and sprocket 14 which in turn drives the chain 13 to rotate the sprocket 12 and thereby move the endless apron 9 over the several rollers 10 and the guide 7.

Reference character 16 indicates a support for the friction drive unit which may be bolted to or formed integrally with the frame 6 of the machine. Bearing brackets 17 preferably formed integral with the support 16 receive the bearings 18, one bearing being secured in fixed relation to the support 16 by means of a taper pin 19 to maintain a drive shaft 20 in proper relation to a driven shaft 20 to be described hereinafter. A driving sheave 21, pinned or keyed to the shaft 20, is provided with peripheral grooves of different diameters in either of which a belt 22 driven by a motor (not shown) engages. The left end of the shaft 20, as viewed in Fig. 2, is of reduced diameter and provides a shoulder 23 against which the collar 24 abuts. The reduced portion of the drive shaft has mounted thereon a governor 25 which comprises a generally annular casting 26 and L-shaped levers 27 pivoted at 28 on diametrically opposed portions thereof. The outer ends of the long arm of the levers 27 are enlarged or provided with weights 29 while the short arms 30 thereof abut the collar 24. A key 31 in the shaft 20 seats in the key-way 32 of the casting 26 so that the governor will rotate with the drive shaft 20, but the shaft will be free to move longitudinally relative to the governor. By this construction it will be seen that as the drive shaft rotates, the governor balls 29 will move outwardly or away from the shaft 20 causing the short arms 30 of the levers 27 to press against the collar 24. Since the casting 26 abuts the thrust bearing 33, disposed between the casting and the fixed bearing 18, the shaft 20 will be moved toward the right.

A vertical driven shaft 34 mounted in the bearings 35 of the support 16 carries a friction disk or wheel 36 secured thereto by a set screw 37 seated in the hub 38. This wheel includes a plate 39 and a friction ring 40 which projects beyond the periphery of the wheel and which is held on the plate by means of the clamping ring 41. The friction ring may be made of leather, cork or other suitable material. The periphery of the friction ring 40 is of such diameter that it will be slightly spaced from or just barely in contact with the flat or friction face 42 of the driving disk 21. The shaft 34 has secured thereto a worm 43 which is in driving engagement with the worm gear 44 mounted on the shaft 15. It will be recalled that the shaft 15 has a sprocket 14 fixed thereon to drive the chain 13.

In order to change the speed of the shaft 34, and consequently the speed of the chain 13 and the apron 9, this shaft can be adjusted vertically in the bearings 35 by means of a lever 45 pivoted at 46 on the support 16. One end of the lever 45 is pivoted at 47 to a collar 48 mounted between the thrust bearings 49 and the fixed collars 50 locked on the shaft 34 by means of the set screws 51. By shifting the lever 45 about the pivot 46, the shaft 34 may be raised or lowered to move the friction disk 36 away from or toward the center of the driving disk along the face thereof for the purpose of increasing or decreasing the speed of the shaft 34.

The above described unit operates as follows. As the drive shaft is rotated by means of the belt 22 the governor weights 29 fly outward and move the shaft 20 toward the right (Fig. 2) to bring the flat or friction face 42 of the sheave 21 into driving engagement with the leather ring 40 of the friction wheel 36. When the power is cut off and the shaft 20 decelerates, the governor ceases to function and the levers 27 return to the position shown in Fig. 1, so that there is no positive pressure exerted by the sheave 21 against the leather ring 40.

The blue print machine is operated as follows. As sensitized paper 52 fed from the support 53, moves across the table 54, tracings (not shown) are superposed thereon. The paper and the tracings guided by the member 55 are carried by the apron 9 around and below the plate glass guide 7 with the lamps 8 therein, to expose the sensitized paper through the tracings. In order to control the speed of travel of the endless apron, a bell-crank lever 56 is pivoted at 57 on the frame 6 also provided with the segment 58 to which the lever 56 can be locked in adjusted position by means of the hand nut 59. The short arm 60 of the lever 56 is connected to the lever 45 by means of the link 61. It will be seen that by moving the lever 56 about the pivot 57, the lever 45 is moved about the pivot 46 to raise or lower the shaft 34 and thereby move the friction disk 36 along the face of the driving disk 21. As previously mentioned, this changes the speed at which the shaft 34 will rotate. The adjustment of the speed at which the apron 9 is to travel can be readily accomplished even while the machine is idle since there is no positive pressure between the friction face 42 and the friction ring 40. As mentioned heretofore, by omitting positive pressure between the face 42 of the sheave 21 and the ring 40, when the machine is idle, the creation of flattened spots on the ring 40 is prevented.

While one specific embodiment of the invention has been disclosed, it will be apparent that many modifications, variations and adaptations will occur to those skilled in the art. The invention is therefor not to be considered as limited by the description but is to apply to all modifications, variations and adaptations that fall within the scope of the appended claims.

What I claim is:

1. A power transmission unit comprising a longitudinally movable drive shaft, a disk having one face thereof secured on one end of said drive shaft, the other face of said disk being flat, a driven shaft supported at right angles to said drive shaft, a friction wheel carried by said driven shaft with its periphery adjacent said flat face of the disk, and a governor mounted on said drive shaft adapted to move said drive shaft to bring the flat face of said disk into driving engagement with said friction wheel when the drive shaft is rotated.

2. A power transmitting device comprising a longitudinally movable drive shaft, a driving disk fixed to one end of said shaft, a driven shaft, a friction disk on said driven shaft, a governor on said drive shaft operable by the rotation of said drive shaft to move said drive shaft to bring said driving disk into engagement with said friction disk.

3. A power transmitting and speed controlling device comprising a longitudinally movable drive shaft, a driving disk fixed to one end of said shaft, a driven shaft, a friction disk on said driven shaft, a governor on said drive shaft operable by the rotation of said drive shaft to move said drive shaft to bring said driving disk into engagement with said friction disk, and means for relatively moving said friction disk and driving disk to vary the speed of rotation of said driven shaft.

4. A variable speed power transmission unit comprising a longitudinally movable drive shaft, a disk having one face thereof secured on one end of said drive shaft, the other face of said disk being flat, a longitudinally movable driven shaft supported at right angles to said drive shaft, a friction wheel fixed on said driven shaft with its periphery adjacent said flat face of the disk, a governor mounted on said drive shaft adapted to move said drive shaft to bring the flat face of said disk into driving engagement with said friction wheel when the drive shaft is rotated, and means for longitudinally shifting said driven shaft to move said friction wheel relative to said disk to adjust the speed of the driven shaft.

WARREN L. SULLIVAN.